(12) United States Patent
Flynn

(10) Patent No.: US 8,360,477 B2
(45) Date of Patent: Jan. 29, 2013

(54) COMPLIANT CONDUIT CONNECTOR

(75) Inventor: William T. Flynn, Horton, MI (US)

(73) Assignee: Eaton Corporation, Cleveland, OH (US)

( * ) Notice: Subject to any disclaimer, the term of this patent is extended or adjusted under 35 U.S.C. 154(b) by 336 days.

(21) Appl. No.: 12/642,138

(22) Filed: Dec. 18, 2009

(65) Prior Publication Data
US 2011/0148098 A1 Jun. 23, 2011

(51) Int. Cl.
*F16L 21/00* (2006.01)
(52) U.S. Cl. ............... 285/233; 285/234; 285/145.1; 285/302
(58) Field of Classification Search ............. 285/223, 285/231, 233, 234, 145.1, 145.4, 144.1, 148.1, 285/148.3, 400, 403, 302, 121.1, 121.2, 123.4, 285/123.3
See application file for complete search history.

(56) References Cited

U.S. PATENT DOCUMENTS

| | | | |
|---|---|---|---|
| 2,453,597 A * | 11/1948 | Sarver | 285/277 |
| 3,397,894 A | 8/1968 | Mastriforte et al. | |
| 3,438,657 A * | 4/1969 | Torres | 285/233 |
| 3,510,155 A | 5/1970 | Jacobus | |
| 3,669,474 A | 6/1972 | Bode | |
| 4,061,366 A * | 12/1977 | Affa | 285/37 |
| 4,236,737 A | 12/1980 | Herbert et al. | |
| 4,249,786 A | 2/1981 | Mahoff | |
| 4,431,216 A * | 2/1984 | Legris | 285/104 |
| 4,465,330 A * | 8/1984 | De Cenzo | 439/92 |
| 4,881,760 A | 11/1989 | Runkles et al. | |
| 4,900,070 A | 2/1990 | Runkles et al. | |
| 4,928,202 A * | 5/1990 | Gale et al. | 361/215 |
| 5,011,193 A | 4/1991 | Porte | |
| 5,106,129 A * | 4/1992 | Camacho et al. | 285/233 |
| 5,131,689 A * | 7/1992 | Bates | 285/87 |
| 5,188,400 A | 2/1993 | Riley et al. | |
| 5,290,075 A | 3/1994 | Allread | |
| 5,620,210 A | 4/1997 | Eyster et al. | |
| 5,959,828 A | 9/1999 | Lewis et al. | |

(Continued)

FOREIGN PATENT DOCUMENTS

| | | |
|---|---|---|
| EP | 1143078 A1 | 10/2001 |
| EP | 1632617 A2 | 3/2006 |
| WO | WO-0079167 A2 | 12/2000 |
| WO | WO-2008/136959 A1 | 11/2008 |

OTHER PUBLICATIONS

International Search Report, PCT/IB2010/003296, May 25, 2011.

*Primary Examiner* — James Hewitt
*Assistant Examiner* — Jay R Ripley
(74) *Attorney, Agent, or Firm* — Rader, Fishman & Grauer PLLC

(57) ABSTRACT

A compliant conduit connector system for the sealed joining of two fluid conduits having two or more slip bearings to maintain mechanical connection between the two fluid conduits and a sealing o-ring to maintain a fluid seal between the two fluid conduits is disclosed. A socket having an inner surface including a sealing surface is formed on an end of a first fluid conduit. A plurality of slip bearings are held in position on the outer surface of a second fluid conduit by respective bearing channels attached to an outer surface of the second fluid conduit where the slip bearings are in mechanical contact with an inner surface of the socket formed in the first fluid conduit. The o-Ring makes sealing contact with a sealing surface defined as part of the inner surface of the first fluid conduit. To assure electrical conductivity a conductor assembly contacts both the first fluid conduit and the second fluid conduit.

15 Claims, 3 Drawing Sheets

U.S. PATENT DOCUMENTS

| | | | |
|---|---|---|---|
| 6,073,973 A * | 6/2000 | Boscaljon et al. | 285/81 |
| 6,682,102 B1 | 1/2004 | Betz | |
| 6,880,859 B2 | 4/2005 | Breay et al. | |
| 6,883,836 B2 * | 4/2005 | Breay et al. | 285/189 |
| 6,905,144 B2 * | 6/2005 | Vila | 285/223 |
| 6,971,682 B2 | 12/2005 | Hoang et al. | |
| 7,222,889 B2 | 5/2007 | Breay | |

* cited by examiner

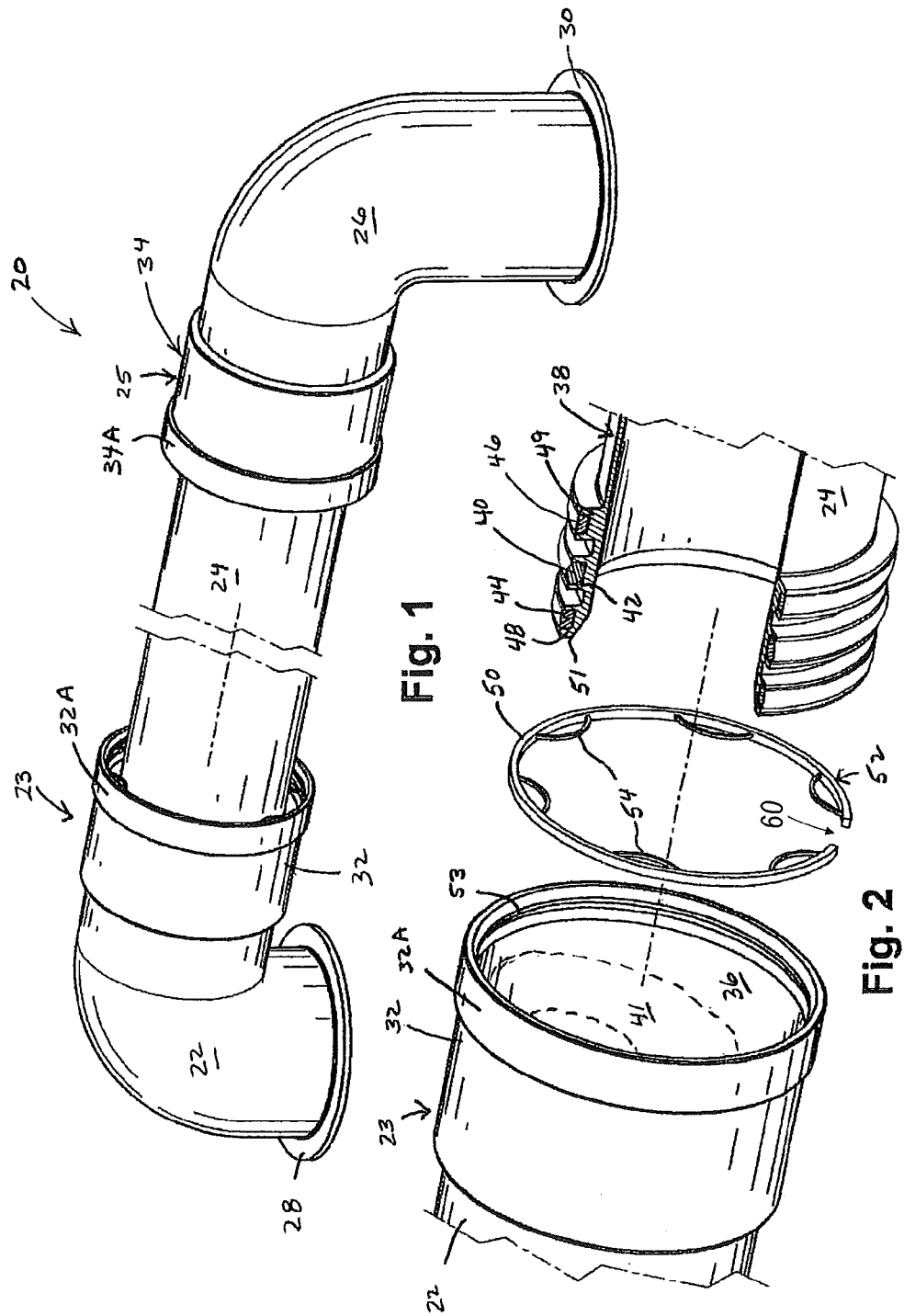

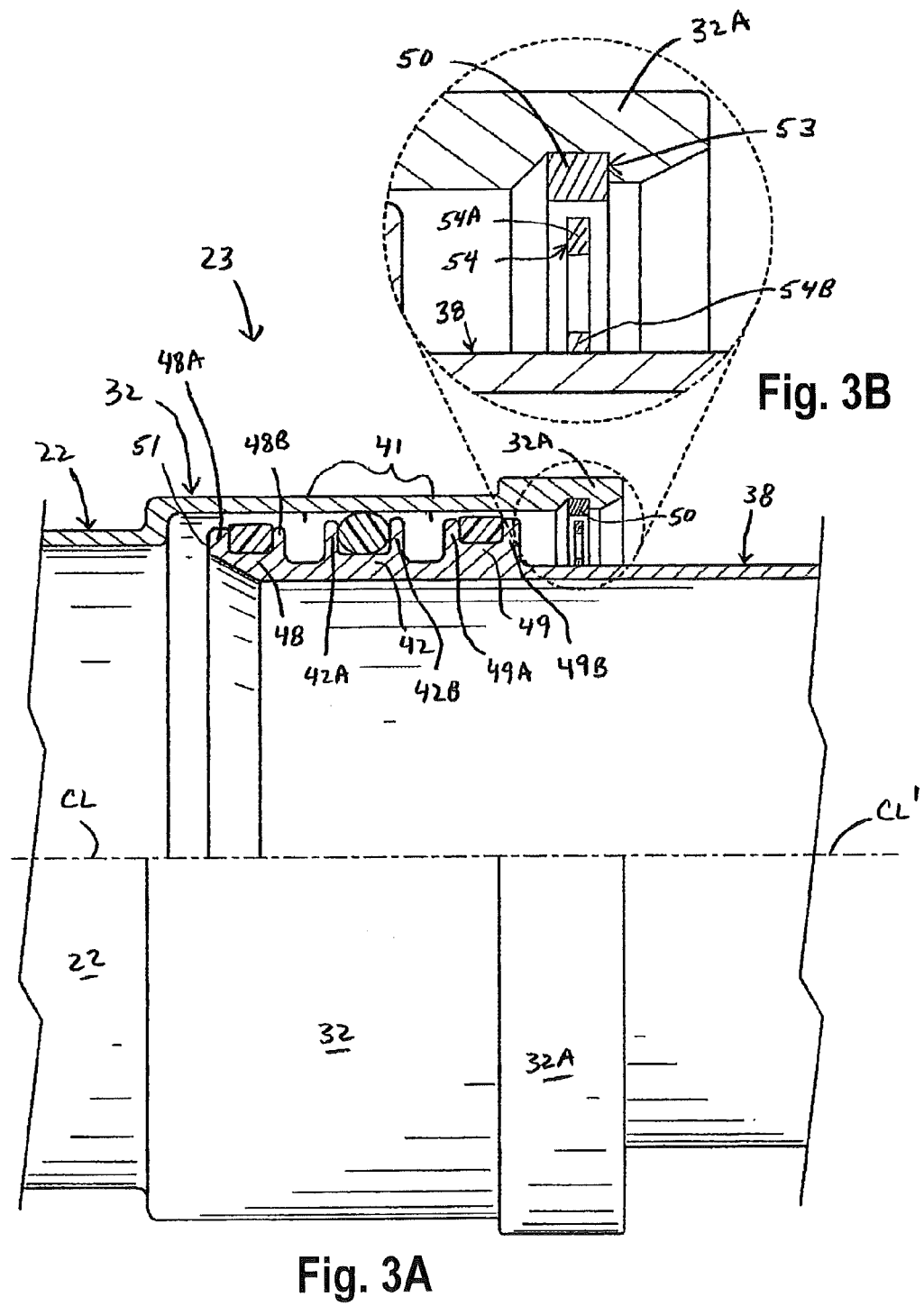

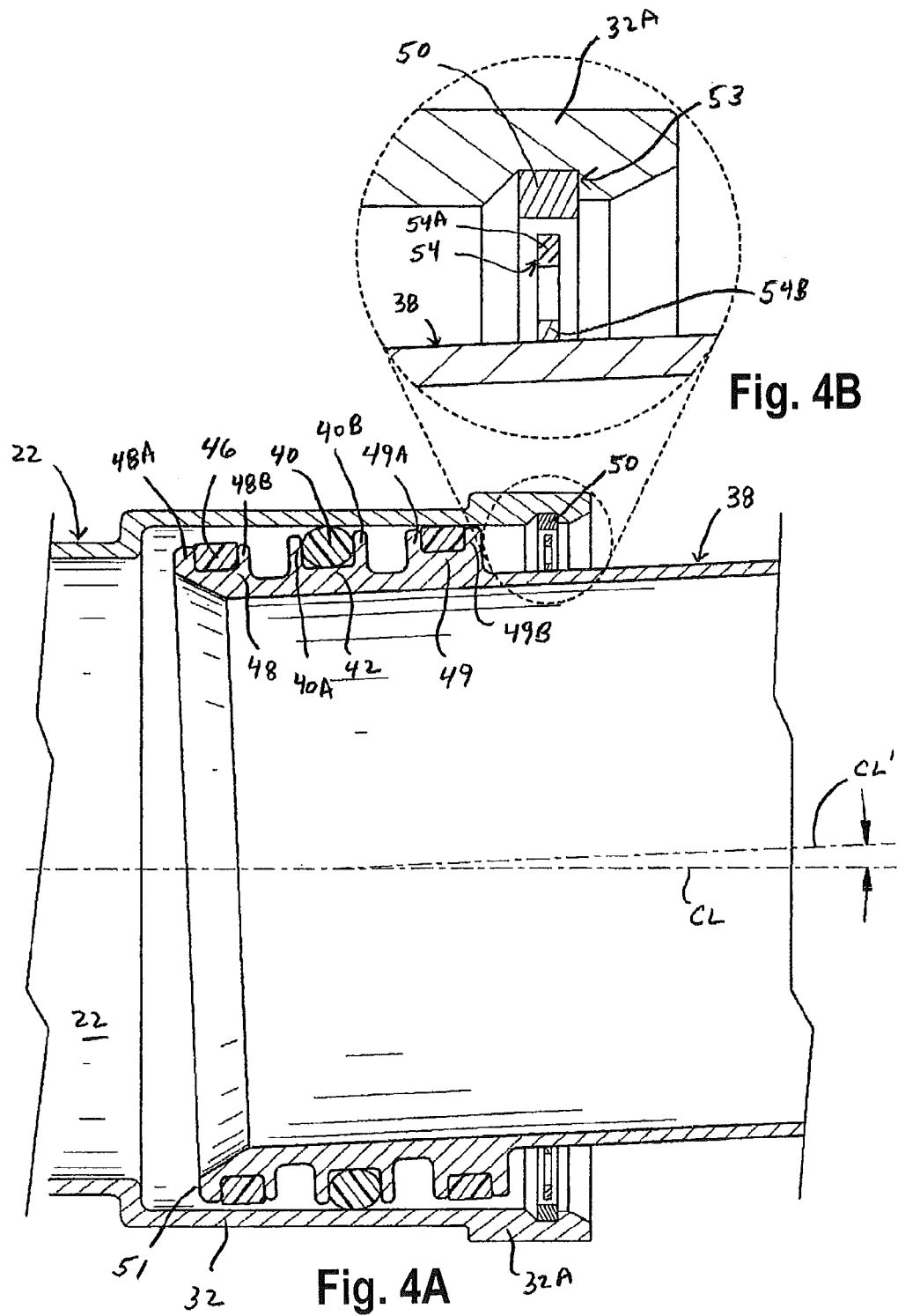

COMPLIANT CONDUIT CONNECTOR

TECHNICAL FIELD

The compliant conduit connector system relates to a fluid coupling system for joining two fluid conduits or pipes such that the two conduits are sealed one to the other but are relatively free to move and deflect relative to one another while remaining in a sealed relationship.

BACKGROUND ART

Because of space confinements within an aircraft, there is difficulty in connecting two fluid conduits such as fuel lines within the aircraft structure. Thus, there is a need for a conduit connector system that is easy to install in confined areas. There is also a need to allow relative movement between the fluid conduits due to operational stresses imposed on the fuel system and aircraft structure. Known are ball type joints for connecting fluid conduits such as that disclosed in Mahoff U.S. Pat. No. 4,249,786 Compliant Coupling. In the type of joint disclosed in the Mahoff patent an o-ring is held in a channel formed on the outside surface of a first conduit and is positioned to contact and seal against an inside surface of the second conduit. In Breay et al. U.S. Pat. No. 6,880,859 Conduit Coupling Assembly, a conduit coupling assembly is provided for interconnecting a pair of fluid conduits such as tubes or pipes. The coupling assembly includes a longitudinally split coupler having a pair of coupling halves rotatable about a hinge. A pair of opposed latches hold the split coupler around the tubes clamping o-rings between the coupler and grooves formed in a coupling flange. Electrical conductivity between all of the components is maintained with the use of a bonding/jumper wire.

In Hoang et al. U.S. Pat. No. 6,971,682 Coupling Assembly, discloses a coupling assembly for connecting first and second fuel handling conduits using two separate split hinged couplings. One conduit pair are inner conduits and a second pair are outer conduits which encircle the inner conduits where both use hinged latch couplings to hold the split ends of the couplings together. The use of two nested conduits and two separate latch couplings provides redundancy and protection against fuel leakage. The latch couplings are held together using latch segments that engage latch pins.

In EP 1 632 617 A2 Ball joint for pipes and well comprising such a joint, assigned to Uponor Innovation AB published on Aug. 3, 2006, a sealed joint between two pipes using a connecting element that uses two o-rings is disclosed. The connecting element uses a spherical surface formed on the inside surface of a socket section, An o-ring seals this surface to a sealing channel formed on the outside surface of a second pipe. A second o-ring is retained in a groove formed in the outer edge of the first pipe and seals against the seal channel. This design provides for some movement between the first and second pipes but wear coan occur on the spherical surface due to metal to metal contact with the seal channel structure. Once wear and galling occurs, it is highly likely that fluid leakage will occur.

In another prior art embodiment, a metal slip ring is positioned adjacent to the o-ring to provide a mechanical centering action to try and improve the centering and hence sealing of the o-ring between the inner and outer surfaces of the first and second conduits. The slip ring is split to allow the ring to be assembled into a groove raised section on either the first or the second conduit. Thus, it is adjacent the o-ring seal on either the inner or outer side of the o-ring. Again, the problem is that this design, while an improvement over the design described about without the slip ring, does leak fluid if there is a substantial degree of relative movement between the first and second conduits.

If relative axial movement is allowed in the o-ring seal type of connection, any side load on one of the joined conduits results in metal to metal contact on the surface where the o-ring seals against. This eventually results in fluid leakage past the o-ring. The problem is that with an increased range of relative motion between the first and second conduits, there would be leakage past the o-ring on either the outside surface of the first conduit or between the o-ring and the inside surface of the second conduit.

SUMMARY OF THE INVENTION

The exemplary compliant connector provides for easy installation of a sealed connection between a first and a second fluid conduit which allows relative motion between the first and second conduits. A socket is formed in an end section of a first fluid conduit which has an inner surface. An o-ring seal is held in a seal channel where a plurality of slip bearings are positioned some distance to either side of the seal channel. The slip bearings are held in bearing channel rings that are formed or attached to the outside surface of a second fluid conduit. In this manner, the slip bearings and the o-ring contact the inner surface of the socket formed as part of the first fluid conduit. The o-ring is ideally in constant contact with the inner surface of the socket formed in the first fluid conduit and with the seal channel around the complete circumferential surface to provide for a fluidic seal between the first and second conduits. In this manner a seal is formed between the inner surface of the first fluid conduit and an outside surface of the second fluid conduit. The slip bearings are positioned in bearing channels axially displaced on both sides of the o-ring. The bearing channels are formed or attached to the outer surface of the second fluid conduit. A plurality of slip bearings are disposed and are supported in a corresponding number of bearing channels. There are bearing channel rings that form the sides of the bearing channels and help hold the slip bearings in position. The positioning of the seal channel rings and hence the slip bearings on both sides of the slip bearing provide for stabilization in the geometry between the first fluid conduit relative to the second fluid conduit in that the relative distance between the outer surface of the second fluid conduit is held substantially concentric to the inner surface of the first fluid conductor at the axial position of the seal channel providing for a good seal by the o-ring. In either the case of relative axial motion or in the case of angular relative motion, the slip bearings hold the first and second fluid conduits in a geometry that facilitates the sealing by the o-ring seal between the inner surface of the socket and the outer surface of the second fluid conduit. Whereas, the prior art couplings do not allow significant radial travel of a second fluid conduit relative to a first fluid conduit, the exemplary compliant conduit connector system allows up to 0.015 inches of travel. Whereas, the prior art couplings are not designed to take high radial loads, the exemplary compliant conduit connector system can absorb these very high radial loads. Whereas, the prior art couplings provide up to +/−2.0 degrees of conical motion, the exemplary compliant conduit connector system allows up to +/−3.7 degrees of conical motion. Whereas, the prior art couplings permit metal to metal contact at the extreme motion limits, the exemplary compliant conduit connector system prevents metal to metal contact between the fluid conduits with the use of the polymeric slip bearings and an elastomeric seal (o-ring). Whereas, most prior art couplings must be externally supported to prevent relative motion that would cause metal to metal contact between the joined conduits, the exemplary compliant conduit connector system permits a fluid conduit such as a tube to be unsupported except by the elastomeric seal (o-ring) and at least two slip bearings. One exception is a series of fuel conveyance products sold by Eaton Corporation as described in the referenced art. However, these prior art couplings do not allow the wide range of motion allowed by the exemplary compliant conduit connector system.

Significantly, the exemplary compliant connector system provides for contact between an o-ring and a sealing surface area of the inner surface of the socket formed on the first conduit where the sealing surface does not come in contact with the bearing channels or the seal channel. This geometry prevents the wear or galling of the sealing surface so that the o-ring can maintain an effective seal.

Another feature of the exemplary compliant connector system is the incorporation of a conductor assembly held partially within a retaining ring where the retaining ring engages a retainer groove formed in the socket which bifurcates the inner surface and thereby mechanically retains the first fluid conduit to the second fluid conduit. The conductor assembly contacts both the socket through the retaining ring and the outer surface of the second fluid conduit to provide for electrical conductivity between the first fluid conduit and the second fluid conduit. The retaining ring engages the retainer groove formed in the inner surface of the second fluid conduit and the outer surface of the second fluid conduit. Electrically conducting loops and a conducting ring continuously make electrical contact with both the first and second fluid conduits through the retaining ring.

DESCRIPTION OF THE DRAWINGS

FIG. 1 is a cross-sectional view of the compliant conduit connector without a retainer ring;

FIG. 3A is a cross-section view of the compliant conduit connector showing the first conduit in alignment with the second conduit;

FIG. 3B is an enlarged partial view of the compliant conduit connector of FIG. 3A;

FIG. 4A is a cross-section view of the compliant conduit connector showing the first conduit orientated at an angle to the second conduit; and FIG. 4B is an enlarged partial view of the compliant conduit connector of FIG. 4.

FIG. 4 is a cross-section view of the compliant conduit connector showing the first conduit orientated at an angle to the second conduit.

DETAILED DESCRIPTION OF THE INVENTION

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Now referring to FIG. 1 of the drawings, an exemplary cross-section view of the compliant conduit connector system 20 is shown. A first fluid conduit 22 is mechanically connected to a second fluid conduit 24 using the compliant conduit connector system 20 to provide a fluidic seal there between. Note that the following discussion regarding the first fluid coupling 23 is equally applicable to the second fluid coupling 25 and visa versa.

Mounting flanges 28, 30 are used to secure the first and third conduits 22, 26 to system components such as fuel pumps, fuel tanks, fuel filters or fuel valves. When in operation, these components will exhibit relative motion and hence, there is a need for compliance in any device that connects them such as the exemplary compliant conduit system 20 shown in FIG. 1 which is especially adaptable for use in fuel handling systems.

Formed on one end of the first and third fluid conduits 22, 26 are respective first and second sockets 32, 34 which house and are part of the first and second fluid couplings 23, 25. At the far end of each of the sockets 32, 34 are respective outer ring sections 32A, 34A which include a retaining groove (see FIG. 2) formed in and bifurcating an inner surface 36 of the socket 40.

Now referring to the drawings and specifically to FIG. 2, a partial exploded assembly drawing of the exemplary compliant conduit connector system 20 is shown. The first fluid conduit 22 is joined to the second fluid conduit 24 using the first conduit coupler 23. A first socket 32 is formed on the end of the first fluid conduit 22 which has an outer ring section 32A and an inner surface 36.

An o-ring 40 is positioned in a seal channel 42 (see FIG. 2) that is formed or attached to an outer surface 38 of the second fluid conduit 24. The o-ring 40 fits in this seal channel 42 and provides a fluid seal between the first conduit and the second conduit 22, 24 by contacting both the seal channel 42 and an inner surface 36 of the first fluid conduit 22. This allows for the maintenance of a fluid seal between the first fluid conduit 22 and the second conduit 24 even when there is some minimal movement or angular displacement between the first and second fluid conduits 22, 24. To better maintain the geometrical relationship between the first and second fluid conduits 22, 24, a plurality of slip bearings 44, 46 are positioned in bearing channels 44, 46 formed on the outer surface 38 of the second conduit 24 where at least one slip bearing 48, 49 is located on each side of the o-ring 40 at a predetermined distance from the o-ring 40. Note that the following discussion regarding the first fluid coupling 23 is equally applicable to the second fluid coupling 25 and visa versa.

The slip bearings 48, 49 are metal bands or rings that can be made from many materials or combinations of materials such as one of a selected group of low friction polymeric materials such as PTFE (Polytetrafluoroethylene) filled with bronze powder or PEEK (Polyetheretherketone) filled with PTFE. The slip bearings 44, 46 are split to allow assembly onto the bearing channel 48, 49 that is formed or attached to the outside surface 38 of the second fluid conduit 24. The edges of the slip bearings 44, 46 are radiused to facilitate changes in the angular alignment of the first and second fluid conduits 22, 24. As the angle of one of the first or second fluid conduits 22, 24 is changed, the slip bearings 44, 46 slide on the inner surface 36 of the socket 32 formed in the first fluid conduit 22 and act to maintain the desired gap or separation between the inner surface 36 and the outer surface 38 of the first and second fluid conduits 22, 24 so that the o-ring 40 can properly seal the interface. The connection socket 40 is shown formed on the end of the first fluid conduit 22 which includes the socket 40 having an inner surface 36 and a retainer groove 53.

In addition, the use of at least two slip bearings 44, 46 that are axially displaced from the o-ring 40 allow for the absorption of the forces generated between the first and second fluid conduits to be transferred through the slip bearings 44, 46 which do not ever touch the inner surface 36 in the area where the o-ring 40 makes contact with the inner surface 36. Thus, there is no wear or galling of the inner surface 36 where the o-ring 40 seals against. This area is identified as sealing surface 41 in FIGS. 3 and 4.

The slip bearings 44, 46 allow the bending type loads placed on the first and second fluid conduits 22, 24 to be increased while still maintaining a seal between the first and second fluid conduits. The placement of the slip bearing on both sides of the o-ring seal 40 and the seal channel 42 provides this high load and high deflection capability.

A specific area of the inner surface 36 is contacted by the o-ring 40 throughout the operation extremes of the compliant conduit connector system 20 which is identified using dashed lines as the sealing surface 41. This sealing surface 41 after assembly of the first fluid conduit 22 to the second fluid conduit 24, never makes metal to metal contact with either the seal channel 42 or either of the bearing channels 48, 49. The motion of the first fluid conduit 22 to the second fluid conduit 24 is limited inwardly by the conduit end 51 contacting the socket 32 and at the other extreme outwardly, by the retaining ring 50 contacting the second bearing channel 49 at the second bearing channel ring 49B (see FIG. 3). These movement extremes define the boundaries of the sealing surface 41 by the movement of the o-ring 40 as these movement extremes are reached.

The o-ring 40 is held in a seal channel 42 while the first and second slip bearings 44, 46 are held in respective first and second bearing channels 48, 49. The o-ring 40 can seal against the second tube outer surface 38 at the bottom of the seal channel 42 or the o-ring 40 can seal against one or both of the seal channel rings 42A, 42B (see FIG. 3).

The slip bearings 44, 46 can be made of a low friction material such as, for example, Polytetrafluoroethylene (PTFE) filled with bronze powder or Polyetheretherketone (PEEK) filled with PTFE. The slip bearings 44, 46 function to maintain the clearance between the inner surface 36 of the socket 32 and the seal channel 42 within a given range to insure good sealing by the o-ring 40 while allowing some degree of movement of the first fluid conduit 22 relative to the second fluid conduit 24. This movement can be either axial, radial or conical or a combination thereof. In addition, the use of at least two slip bearings 44, 46 that are axially displaced from the o-ring 40 allow for the absorption of the forces generated between the first and second fluid conduits to be transferred through the slip bearings 44, 46 which do not ever touch the inner surface 36 in the area where the o-ring 40 makes contact with the inner surface 36. Thus, there is no wear or galling of the inner surface 36 where the o-ring 40 seals against. This area is identified as sealing surface 41 in FIGS. 3 and 4.

During assembly, the first fluid conduit 22 is inserted into the second fluid conduit 24 and then the flange 28 is used to mount the first and second fluid conduits 22, 24 to a device such as a fuel pump (not shown). The second fluid conduit 24 is inserted into the first socket 32 so that the second bearing channel 49 axially extends into the first socket 32 so that the retaining ring 50 can be inserted into the first socket 32 to engage the retaining groove 53. The retaining ring 50 of the retaining ring assembly 52 functions to prevent the second fluid conduit 24 from being withdrawn from the first fluid conduit 24. An optional element shown as conductor assembly 54 is shown as an additional element that can be added to the retaining ring 50 to form the retaining ring assembly 52 provides an electrical grounding path between the first and second fluid conduits 22, 24 to prevent electrical discharge or sparking in certain applications.

Now referring to FIG. 3A of the drawings, a partial cross-sectional view of the compliant conduit connection system 20 is shown. The first fluid conduit 22 is joined to the second fluid conduit 24 using the first conduit coupler 23. A first socket 32 is formed on the end of the first fluid conduit 22 which has an outer ring section 32A and an inner surface 36. A specific area of the inner surface 36 is contacted by the o-ring 40 throughout the operation extremes of the compliant conduit connector system 20 which is identified using dashed lines as the sealing surface 41. After assembly of the first fluid conduit 22 to the second fluid conduit 24, the sealing surface 41 never makes metal to metal contact with either the seal channel 42 or either of the bearing channels 48, 49. The motion of the first fluid conduit 22 relative to the second fluid conduit 24 is limited inwardly by the conduit end 51 contacting the socket 32 and at the other extreme outwardly, by the retaining ring 50 contacting the second bearing channel 49 at the second bearing channel ring 49B (see FIG. 3A). These movement extremes define the boundaries of the sealing surface 41 by the movement of the o-ring 40 as these movement extremes are reached.

The o-ring 40 is held in a seal channel 42 while the first and second slip bearings 44, 46 are held in respective first and second bearing channels 48, 49. The o-ring 40 can seal against the second tube outer surface at the bottom of the seal channel 42 or the o-ring 40 can seal against one or both of the seal channel rings 42A, 42B (see FIGS. 3A & 4A).

The slip bearings 44, 46 can be made of a low friction material such as, for example, PTFE filled with bronze powder or PEEK filled with PTFE. The slip bearings 44, 46 function to maintain the clearance between the inner surface 36 of the socket 32 and the seal channel 42 within a given range to insure good sealing by the o-ring 40 while allowing some degree of movement of the first fluid conduit 22 relative to the second fluid conduit 24. This movement can be either axial, radial or conical or a combination thereof. In addition, the use of at least two slip bearings 44, 46 that are axially displaced from the o-ring 40 allow for the absorption of the forces generated between the first and second fluid conduits to be transferred through the slip bearings 44, 46 which do not ever touch the inner surface 36 in the area where the o-ring 40 makes contact with the inner surface 36. Thus, there is no wear or galling of the inner surface 36 at the sealing surface 41 where the o-ring 40 seals against.

During assembly, the first fluid conduit 22 is inserted into the second fluid conduit 24 and then the flange 28 is used to mount the first and second fluid conduits 22, 24 to a device such as a fuel pump (not shown). The second fluid conduit 24 is inserted into the first socket 32 so that the second bearing channel 49 axially extends into the first socket 32 so that the retaining ring 50 can be inserted into the first socket 32 to engage the retaining groove 53. The retaining ring 50 functions to prevent the second fluid conduit 24 from being withdrawn from the first fluid conduit 24. An optional element as shown as grounding contactors 54 can be added to retaining ring 50 to provide an electrical grounding path between the first and second fluid conduits 22, 24 to prevent electrical discharge or sparks in certain applications.

Clearly shown is the seal section 41 on the inner surface 36 of the socket 32 where the o-ring 40 contacts and seals against the inner surface 36 throughout the full range of relative motion between the first and second fluid conduits 22, 24. The second fluid conduit 24 can move axially until the end 51 of the second fluid conduit 24 contacts the bottom of the socket 32. At the other extreme, the second fluid conduit 24 can move axially outward until the second bearing channel ring 49B contacts the retaining ring 50. In this exemplary illustration, the first fluid conduit 22 is in axial alignment as shown by the coinciding centerlines CL and CL' where the first fluid conduit 22 has centerline CL and the second fluid conduit 24 has centerline CL'.

In FIG. 3B an exploded view of a portion of the exemplary compliant conduit connector system 20 is shown which more clearly shows the construction of the retaining ring assembly 52 which consists of the retaining ring 50 and the conductor assembly 54. The conductor assembly 54 includes a conductor ring 54A which is attached to a plurality of conductor loops 54B where the conductor ring 54A electrically contacts the retaining ring 50 and the conductor loops 54B electrically contact the outer surface 38 of the second fluid conduit 24. The conductor assembly 54 is allowed to slide in a ring slot 60 formed in the retaining ring 50. The use of the conductor assembly 54 is optional depending on whether electrical conduction is desired between the first and second fluid conduits 22, 24 which is desirable in, for example, fuel system applications.

Now referring to FIG. 4A of the drawings, a partial cross-sectional view of the compliant conduit connection system 20 is shown. The first fluid conduit 22 is joined to the second fluid conduit 24 using the first conduit coupler 23. In this view, a degree of misalignment between the first and second fluid conduits 22, 24 is shown by the difference in alignment between the centerline CL' of the first fluid conduit and the centerline CL' of the second fluid conduit 24. This misalignment can be induced during assembly or during operation and results in the first bearing channel 48 moving downward and the second bearing channel 49 moving upward as depicted in the partial cross-sectional view of FIG. 4A. In fact, the first bearing channel 48 and specifically the first bearing channel rings 48A and 48B move away from the inner surface 36 while on their opposite side the first bearing channel rings 48A and 48B move closer to the inner surface 36. In a similar manner, the second bearing channel 49 and specifically the second bearing channel rings 49A and 49B move away from the inner surface 36 while on the opposite side the second bearing channel rings 49A and 49B move towards from the inner surface 36. In the opposite extreme of motion of the first fluid conduit 22 relative to the second fluid conduit 24, the first bearing channel 48 and specifically the first bearing channel rings 48A and 48B move towards the inner surface 36 while on their opposite side the first bearing channel tings 48A and 48B move away the inner surface 36. In a similar manner, the second bearing channel 49 and specifically the second bearing channel rings 49A and 49B towards the inner surface 36 while on the opposite side the second bearing channel tings 49A and 49B move away the inner surface 36.

A first socket 32 is formed on the end of the first fluid conduit 22 which has an outer ring section 32A and an inner 36. A specific area of the inner surface 36 is contacted by the o-ring 40 throughout the operation extremes of the compliant conduit connector system 20 which is identified using dashed lines as the sealing surface 41. After assembly of the first fluid conduit 22 to the second fluid conduit 24, the sealing surface 41 never makes metal to metal contact with either the seal channel 42 or either of the bearing channels 48, 49. The motion of the first fluid conduit 22 to the second fluid conduit 24 is limited inwardly by the conduit end 51 contacting the socket 32 and at the other extreme outwardly, by the retaining ring 50 contacting the second bearing channel 49 at the second bearing channel ring 49B (see also FIG. 3A). These movement extremes define the boundaries of the sealing surface 41 by the movement of the o-ring 40 as these movement extremes are reached.

The o-ring 40 is held in a seal channel 42 while the first and second slip bearings 44, 46 are held substantially within respective first and second bearing channels 48, 49. The o-ring 40 can seal against the outer surface 38 of the second fluid conduit 24 at the bottom of the seal channel 42 or the o-ring 40 can seal against one or both of the seal channel rings 42A, 42B (see FIG. 3A).

The slip bearings 44, 46 can be made of a low friction material such as, for example, PTFE filled with bronze powder or PEEK filled with PTFE. The slip bearings 44, 46 function to maintain the clearance between the inner surface 36 of the socket 32 and the seal channel 42 within a given range to insure good sealing by the o-ring 40 while allowing some degree of movement of the first fluid conduit 22 relative to the second fluid conduit 24. This movement can be either axial, radial or conical or a combination thereof. In addition, the use of at least two slip bearings 44, 46 that are axially displaced from the o-ring 40 allow for the absorption of the forces generated between the first and second fluid conduits to be transferred through the slip bearings 44, 46 which do not ever touch the inner surface 36 in the area where the o-ring 40 makes contact with the inner surface 36. Thus, there is no wear or galling of the inner surface 36 where the o-ring 40 seals against this sealing surface 41.

During assembly, the first fluid conduit 22 is inserted into the second fluid conduit 24 and then the flange 28 is used to mount the first and second fluid conduits 22, 24 to a device such as a fuel pump (not shown). The second fluid conduit 24 is inserted into the first socket 32 so that the second bearing channel 49 axially extends into the first socket 32 so that the retaining ring 50 can be inserted into the first socket 32 to engage the retaining groove 53. The retaining ring 50 functions to prevent the second fluid conduit 24 from being withdrawn from the first fluid conduit 24. An optional element as shown as conductor assembly 54 can be added to retaining ring 50 to provide an electrical grounding path between the first and second fluid conduits 22, 24 to prevent electrical discharge or sparks in certain applications.

Clearly shown is the seal section 41 on the inner surface 36 of the socket 32 where the o-ring 40 contacts and seals against the inner surface 36 throughout the full range of relative motion between the first and second fluid conduits 22,24. The second fluid conduit 24 can move axially until the end 51 of the second fluid conduit 24 contacts the bottom of the socket 32. At the other extreme, the second fluid conduit 24 can move axially outward until the second bearing channel ring 49B contacts the retaining ring 60. In this exemplary illustration, the first fluid conduit 22 is in axial alignment as shown by the coinciding centerlines CL and CL' where the first fluid conduit 22 has centerline CL and the second fluid conduit 24 has centerline CL'.

An exploded view of a portion of the compliant conduit connector system 20 is shown in FIG. 4B which more clearly shows the construction of the retaining ring assembly 52 consisting of the retaining ring 50 and the conductor assembly 54. The conductor assembly 54 includes a conductor ring 54A which is attached to a plurality of conductor loops 54B where the conductor ring 54A electrically contacts the retaining ring 50 and the conductor loops 54B electrically contact the second fluid conduit 24. The conductor assembly 54 is allowed to slide in a ring slot 60 formed in the retaining ring 50. The use of the conductor assembly 54 is optional depending on whether electrical conduction is desired between the first and second fluid conduits 22, 24 which is desirable in, for example, fuel system applications.

This disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

What is claimed is:

1. A conduit connector system for connecting and sealing a first fluid conduit to a second fluid conduit where the first conduit moves axially a distance relative to the second conduit, the conduit connector system comprising:
   a first fluid conduit;
   a socket formed on said first fluid connector conduit proximate a first terminal end of said first fluid conduit, said socket having an inner surface, said inner surface having a seal surface portion adjoined by bracketing bearing surface portions, and said inner surface bracketed by a groove proximate the first terminal end and a socket bottom surface distal the first terminal end, said bottom surface extending radially inward in relation to said inner surface; and
   a second fluid conduit;
   said second fluid conduit having an outside surface and a second terminal end, a seal channel formed on said outside surface of the second fluid conduit, first and second bearing channels formed on said outside surface of the second fluid conduit bracketing said seal channel, each bearing channel located axially a respective specified distance from said seal channel, said first bearing channel proximate the second terminal end and said second bearing channel distal the second terminal end, wherein each of said bearing channels and said seal channel comprise a bottom surface and respective side radially extending channel rings;
   a first slip bearing in said first bearing channel and a second slip bearing in said second bearing channel;
   a seal engaging said seal channel, wherein said first and second fluid conduits are assembled together such that at least one of said first and second slip bearings contact a respective said inner surface bearing surface portion of said socket, said seal contacting said inner surface of said socket at said sealing surface portion sealing said first fluid conduit to said second fluid conduit; and
   a retaining ring engaging said groove and extending radially inward that blocks axial displacement of said second slip bearing outside of said socket by contact with the most distal from the second terminal end channel ring of said second bearing;
   wherein said first fluid conduit and said second fluid conduit are configured to be relatively free to move and deflect relative to one another while remaining in a sealed relationship, thereby allowing relative axial movement in relation to one another, the axial movement having a full range distance limited by contact between said bottom surface of the socket with a region adjacent the second terminal end of the second fluid conduit at one extreme and the full range is limited by contact between the retaining ring and the most distal from the second terminal end channel ring of said second bearing at the other extreme;
   wherein during said full range of axial movement of said first fluid conduit and said second fluid conduit in relation to one another while interconnected, said seal only contacts said seal surface portion of said socket inner surface;
   wherein during said full range of axial movement of said first fluid conduit and said second fluid conduit in relation to one another while interconnected, said first slip bearing and said second slip bearing can only contact respective said bearing surface portions of said socket inner surface and can never make contact with said seal surface portion of said socket inner surface; and
   wherein during said full range of axial movement of said first fluid conduit and said second fluid conduit in relation to one another while interconnected, none of said channel rings make contact with said seal surface portion of said socket inner surface.

2. The conduit connector system of claim 1 wherein said seal is an o-ring.

3. The conduit connector system of claim 1 wherein said first slip bearing is made of polytetrafluoroethylene and bronze.

4. The conduit connector system of claim 1 wherein said first slip bearing is made of polyetheretherketone.

5. The conduit connector system of claim 1 further comprising a conductor assembly engaging said retaining ring and electrically contacting said retaining ring and said second fluid connector.

6. The conduit connector system of claim 5 wherein said conductor assembly includes conductor loops connected to a conductor ring.

7. A conduit connector system for connecting a first fluid conduit to a second fluid conduit where the first conduit moves axially a distance relative to the second conduit, the conduit connector system comprising:
   a first fluid conduit;
   a socket formed on said first fluid conduit proximal a first terminal end of said first fluid conduit, said socket having an inner surface with a sealing surface portion and a retaining groove located proximate an open end of said socket and formed in said inner surface, said socket having a socket bottom surface extending radially inward from said inner surface;
   a second fluid conduit;
   wherein said second fluid conduit has a second terminal end;
   a plurality of bearing channels formed on an outside surface of said second fluid conduit, wherein each bearing channel comprises a bottom and respective side radially extending channel rings;
   at least one seal channel formed on said outside surface of said second fluid conduit, wherein each seal channel comprises a bottom and respective side radially extending channel rings;

wherein said at least one seal channel is axially bracketed by at least a bearing channel proximal said second terminal end and at least a bearing channel distal said second terminal end;

a slip bearing supported in one of said plurality of bearing channels;

a seal supported in one of said at least one seal channel; and a retaining ring engaging said retainer retaining groove and extending radially inward that axially blocks an opposing one of said bearing channel rings from being axially displaced outside of said socket;

wherein said first fluid conduit and said second fluid conduit are configured to be relatively free to move and deflect relative to one another while remaining in a sealed relationship, thereby allowing relative axial movement in relation to one another, the axial movement having a full range distance limited by contact between said bottom surface of the socket with the second terminal end of the second fluid conduit at one extreme and the full range is limited by contact between the retaining ring and the an opposing one of said bearing channel rings at the other extreme;

wherein during said full range of axial movement of said first fluid conduit and said second fluid conduit in relation to one another while interconnected, said seal supported in one of said at least one seal channel only contacts said seal surface portion of said socket inner surface, said seal supported in one of said at least one seal channel contacting said inner surface of said socket at said sealing surface portion sealing said first fluid conduit to said second fluid conduit;

wherein during said full range of axial movement of said first fluid conduit and said second fluid conduit in relation to one another while interconnected, said slip bearing supported in one of said plurality of bearing channels can never make contact with said seal surface portion of said socket inner surface; and wherein during said full range of axial movement of said first fluid conduit and said second fluid conduit in relation to one another while interconnected, none of said channel rings make contact with said seal surface portion of said socket inner surface.

8. The conduit connector system of claim 7 further comprising a conductor assembly supported by said retaining ring, said conductor assembly contacting said retaining ring and said outer surface of said second fluid conduit.

9. The conduit connector system of claim 7 wherein said slip bearings contain polytetrafluoroethylene.

10. The conduit connector system of claim 7 wherein said slip bearings are molded of polyetheretherketone.

11. The conduit connector system of claim 7 wherein said seal is an o-ring.

12. The conduit connector system of claim 7 wherein each of said a plurality of bearing channels supports a slip bearing.

13. A conduit connector system for sealingly connecting a first fluid conduit to a second fluid conduit while allowing for axial and angular relative movement between the first and second fluid conduits, the conduit connector system comprising:

a first fluid conduit having a first terminal end;

a socket attached or formed to an end of said first fluid conduit, said socket having an inside surface, said inside surface having a sealing surface portion, and said socket having a socket bottom radially extending inward from said inside surface;

a second fluid conduit having a second terminal end;

at least two slip bearings attached to said second fluid conduit, said at least two slip bearings axially spaced one from the other at a distance greater than the width of said sealing surface portion of said socket;

wherein said at least two slip bearings are held in place by bearing channels formed on an outside surface of said second fluid conduit;

further comprising a retaining groove formed in said socket proximate to an open end of said socket and a retaining ring disposed partially within said retaining groove and said retaining ring extending radially inward so as to interfere with the one of said bearing channels most distal from said terminal end to prevent said second fluid conduit from being withdrawn from said first fluid conduit;

a seal located on said second fluid conduit between said at least two slip bearings, said seal contacting said inside surface at said sealing surface portion such that said at least two slip bearings contact said inside surface outside of said sealing surface portion and said seal contacting said second fluid conduit thereby providing a fluid seal between said first and second fluid conduits;

wherein said seal is held in place by a seal channel formed on an outside surface of said second fluid conduit;

wherein each seal channel and each bearing channel comprises a bottom and respective side radially extending channel rings;

wherein said first fluid conduit and said second fluid conduit are configured to be relatively free to move and deflect relative to one another while remaining in a sealed relationship, thereby allowing relative axial and angular movement in relation to one another, the axial movement having a full range distance limited by contact between said socket bottom with the second terminal end of the second fluid conduit at one extreme and the full range is limited by contact between the retaining ring and said one of said bearing channels most distal from said second terminal end at the other extreme;

wherein during said full range of axial movement of said first fluid conduit and said second fluid conduit in relation to one another while interconnected, said seal located on said second fluid conduit only contacts said seal surface portion of said socket inner surface;

wherein during said full range of axial movement of said first fluid conduit and said second fluid conduit in relation to one another while interconnected, none of said at least two slip bearings make contact with said seal surface portion of said socket inner surface; and wherein during said full range of axial movement of said first fluid conduit and said second fluid conduit in relation to one another while interconnected, none of said channel rings make contact with said seal surface portion of said socket inner surface.

14. The conduit connector system of claim 13 wherein only one of said at least two slip bearings contacts said inside surface.

15. The conduit connector system of claim 13 further comprising at least one conductor loop extending radially inward from said retaining ring to form a retaining ring assembly, said retaining ring assembly making an electrical connection from said first fluid conduit to said second fluid conduit.

* * * * *